United States Patent
Sunil Kumar et al.

(10) Patent No.: US 10,829,117 B2
(45) Date of Patent: Nov. 10, 2020

(54) METHOD AND SYSTEM FOR CORRECTING VELOCITY OF AUTONOMOUS VEHICLE TO NAVIGATE ALONG PLANNED NAVIGATION PATH

(71) Applicant: WIPRO LIMITED, Bangalore (IN)

(72) Inventors: Balaji Sunil Kumar, Bengaluru (IN); Manas Sarkar, Barasat (IN)

(73) Assignee: Wipro Limited, Bangalore (IN)

(*) Notice: Subject to any disclaimer, the term of this patent is extended or adjusted under 35 U.S.C. 154(b) by 170 days.

(21) Appl. No.: 16/036,975

(22) Filed: Jul. 17, 2018

(65) Prior Publication Data

US 2019/0367027 A1 Dec. 5, 2019

(30) Foreign Application Priority Data

May 29, 2018 (IN) .............................. 201841020078

(51) Int. Cl.
| | | |
|---|---|---|
| *G05D 1/00* | (2006.01) | |
| *G05D 13/00* | (2006.01) | |
| *B60W 30/18* | (2012.01) | |
| *G05D 1/02* | (2020.01) | |

(52) U.S. Cl.
CPC ........... *B60W 30/18* (2013.01); *G05D 1/0088* (2013.01); *G05D 1/0274* (2013.01); *B60W 2556/50* (2020.02); *B60W 2720/10* (2013.01)

(58) Field of Classification Search
None
See application file for complete search history.

(56) References Cited

U.S. PATENT DOCUMENTS

| | | | |
|---|---|---|---|
| 7,447,593 B2 | 11/2008 | Estkowski et al. | |
| 8,612,084 B2* | 12/2013 | Hennessy | G05D 1/0278 701/25 |
| 9,568,915 B1 | 2/2017 | Berntorp et al. | |
| 2007/0088469 A1 | 4/2007 | Schmiedel et al. | |
| 2008/0059036 A1* | 3/2008 | Imai | B60W 30/143 701/93 |
| 2017/0146999 A1* | 5/2017 | Cherepinsky | G05D 1/0214 |

* cited by examiner

*Primary Examiner* — Adam D Tissot
(74) *Attorney, Agent, or Firm* — Finnegan, Henderson, Farabow, Garrett & Dunner, LLP (57) ABSTRACT

Disclosed subject matter relates to field of telematics that performs a method of correcting velocity of autonomous vehicle to navigate along a planned navigation path. A velocity correcting system may receive a velocity for navigating the autonomous vehicle for a selected segment along the planned navigation path and may identify plurality of values corresponding to current vehicle condition while the autonomous vehicle is navigating along the planned navigation path and may determine a counter angular velocity corresponding to current vehicle condition by comparing the plurality of values with pre-stored values. Finally, velocity is corrected by correlating the velocity with counter angular velocity and provided to navigation module for applying the correction velocity. The present disclosure eliminates need for continuous monitoring and steering angle adjustment to align the autonomous vehicle with planned navigation path, thereby reducing power consumption and minimizing jerks experienced by autonomous vehicle.

11 Claims, 8 Drawing Sheets

| Pre-Condition: Zero degree curvature (Straight stretch) of 5 meter ||
|---|---|
| Load | Table reference |
| No Load | Table 2 |
| 50Kg | Table 3 |
| 80Kg | Table 4 |
| 100Kg | --- |
| 120Kg | --- |
| 150Kg | --- |

FIG.2B

| Pre-Condition: No load ||
|---|---|
| Slope/5 meter | Counter angular velocity (radian/sec) |
| 0 degree | +/- 0.1 |
| +5 degree | +/- 0.16 |
| +10 degree | +/- 0.21 |
| +15 degree | +/- 0.28 |
| +20 degree | +/- 0.32 |
| +25 degree | +/- 0.38 |
| -25 degree | +/- 0.45 |
| -20 degree | +/- 0.50 |
| -15 degree | +/- 0.55 |
| -10 degree | +/- 0.61 |
| -5 degree | +/- 0.67 |

FIG.2C

| Pre-Condition: 50 Kg load, ||
|---|---|
| Slope/5 meter | Counter angular velocity (radian/sec) |
| 0 degree | +/- 0.12 |
| +5 degree | +/- 0.18 |
| +10 degree | +/- 0.23 |
| +15 degree | +/- 0.27 |
| +20 degree | +/- 0.43 |
| +25 degree | +/- 0.55 |
| -25 degree | +/- 0.61 |
| -20 degree | +/- 0.68 |
| -15 degree | +/- 0.74 |
| -10 degree | +/- 0.81 |
| -5 degree | +/- 0.9 |

FIG.2D

| Pre-Condition: 80 Kg load, ||
|---|---|
| Slope/5 meter | Counter angular velocity (radian/sec) |
| 0 degree | +/- 0.21 |
| +5 degree | +/- 0.29 |
| +10 degree | +/- 0.36 |
| +15 degree | +/- 0.48 |
| +20 degree | +/- 0.52 |
| +25 degree | +/- 0.63 |
| -25 degree | +/- 0.78 |
| -20 degree | +/- 0.85 |
| -15 degree | +/- 0.91 |
| -10 degree | +/- 1.2 |
| -5 degree | +/- 1.26 |

METHOD AND SYSTEM FOR CORRECTING VELOCITY OF AUTONOMOUS VEHICLE TO NAVIGATE ALONG PLANNED NAVIGATION PATH

TECHNICAL FIELD

The present subject matter relates generally to field of telematics, and more particularly, but not exclusively to a method and a system for correcting velocity of an autonomous vehicle to navigate along a planned navigation path.

BACKGROUND

Generally, autonomous vehicles make use of a navigation path for navigating from a source point to a destination point. The autonomous vehicles are vehicles that are capable of sensing environment around them for moving on the road without any human intervention. The autonomous vehicles sense the environment with help of sensors configured to work in systems such as Light Detection and Ranging (LIDAR) system, image capturing devices, Global Positioning System (GPS), and the like.

Existing techniques provide the navigation path for the autonomous vehicles to traverse from the source point to the destination point, along with command velocities such as, linear, and angular velocity to follow a planned navigation path. However, while traversing along the planned navigation path, an autonomous vehicle may deviate from the planned navigation path due to mechanical constraints of the autonomous vehicle. Some of the existing techniques provide a method to continuously monitor the autonomous vehicle and adjust steering angle to align the autonomous vehicle with the planned navigation path, when the deviation occurs. However, continuous adjustment of the steering angle throughout the journey results in excessive power drain from battery of the autonomous vehicle. Also, due to the continuous adjustment, the autonomous vehicle may experience frequent jerks while moving along the navigation path, resulting in an uncomfortable drive. A few other existing techniques provide a method to generate a smooth velocity when the autonomous vehicle presents an unpredictable behaviour, thereby reducing the experience of frequent jerks however, not solving the above mentioned problems.

The information disclosed in this background of the disclosure section is only for enhancement of understanding of the general background of the disclosure and should not be taken as an acknowledgement or any form of suggestion that this information forms prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of correcting velocity of an autonomous vehicle to navigate along a planned navigation path. The method includes receiving, by a velocity correcting system associated with the autonomous vehicle, a velocity for navigating the autonomous vehicle for a selected segment among one or more segments along the planned navigation path. Further, the velocity correcting system identifies a plurality of values corresponding to current vehicle condition, for the selected segment, while the autonomous vehicle is navigating along the planned navigation path. Upon identifying the plurality of values corresponding to the current vehicle condition, the velocity correcting system determines a counter angular velocity corresponding to the current vehicle condition by comparing the plurality of values with pre-stored values. The pre-stored values are generated based on a trial run of the autonomous vehicle under various predefined conditions of the autonomous vehicle. Further, the velocity correcting system corrects the velocity of the autonomous vehicle, by correlating the velocity with the counter angular velocity. Finally, the velocity correcting system provides the correction velocity to a navigation module associated with the velocity correcting system, for applying the correction velocity to navigate the autonomous vehicle along the planned navigation path.

Further, the present disclosure includes a velocity correcting system for correcting a velocity of an autonomous vehicle to navigate along a planned navigation path. The velocity correcting system includes a processor and a memory communicatively coupled to the processor. The memory stores the processor-executable instructions, which, on execution, causes the processor to receive a velocity for navigating the autonomous vehicle for a selected segment among one or more segments along the planned navigation path. Further, the processor identifies a plurality of values corresponding to current vehicle condition, for the selected segment, while the autonomous vehicle is navigating along the planned navigation path. Upon identifying the plurality of values corresponding to the current vehicle condition, the processor determines a counter angular velocity corresponding to the current vehicle condition by comparing the plurality of values with pre-stored values. The pre-stored values are generated based on a trial run of the autonomous vehicle under various predefined conditions of the autonomous vehicle. Further, the processor corrects the velocity of the autonomous vehicle, by correlating the velocity with the counter angular velocity. Finally, the processor provides the correction velocity to a navigation module associated with the velocity correcting system, for applying the correction velocity to navigate the autonomous vehicle along the planned navigation path.

Furthermore, the present disclosure comprises a non-transitory computer readable medium including instructions stored thereon that when processed by at least one processor causes a vehicle correcting system to perform operations comprising receiving a velocity for navigating the autonomous vehicle for a selected segment among one or more segments along the planned navigation path, from a path generation module associated with the velocity correcting system. Further, the instructions cause the processor to identify a plurality of values corresponding to a current vehicle condition, for the selected segment, while the autonomous vehicle is navigating along the planned navigation path. Upon identifying the plurality of values, the instructions cause the processor to determine a counter angular velocity corresponding to the current vehicle condition by comparing the plurality of values with pre-stored values. The pre-stored values are generated based on a trial run of the autonomous vehicle under various predefined conditions of the autonomous vehicle. Finally, the instructions cause the processor to correct the velocity of the autonomous vehicle, by correlating the velocity with the counter angular velocity, and providing the correction velocity to a navigation module associated with the velocity correcting system, for applying the correction velocity to navigate the autonomous vehicle along the planned navigation path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for correcting velocity of an autonomous vehicle to navigate along a planned navigation path. While the autonomous vehicle navigates along the planned navigation path, a velocity correcting system associated with the autonomous vehicle may select a segment among one or more segments in the planned navigation path.

The velocity correcting system associated with the autonomous vehicle, may receive the velocity determined for navigating the autonomous vehicle for the selected segment along the planned navigation path, from a path generation module associated with the velocity correcting system. Further, the velocity correcting system may identify a plurality of values corresponding to current vehicle condition, for the selected segment, while the autonomous vehicle is navigating along the planned navigation path. The current vehicle condition may be defined in terms of one or more parameters. As an example, the one or more parameters may include, but are not limited to, a speed of the autonomous vehicle, a load condition of the autonomous vehicle, a slope of the planned navigation path and a curvature of the planned navigation path. The plurality of values corresponding to the current vehicle condition may be dynamically determined values of the one or more parameters.

Further, in some embodiments, the velocity correcting system may compare the plurality of values corresponding to the current vehicle condition with pre-stored values to determine a counter angular velocity corresponding to the current vehicle condition. In some embodiments, the pre-stored values may be generated by conducting a trial run of the autonomous vehicle under various predefined conditions of the autonomous vehicle. In some embodiments, the velocity correcting system may update the pre-stored values eventually by self-learning. Further, the velocity correcting system may correct the velocity of the autonomous vehicle by correlating the velocity with the counter angular velocity determined for the selected segment and iteratively apply the correction velocity for the selected segment at every predefined cycle time to navigate the autonomous vehicle along the planned navigation path.

In some embodiments, the autonomous vehicle may have possibilities of deviating from the planned navigation path due to the current vehicle condition and a natural tendency/probability of the autonomous vehicle to be deviated from the planned navigation path at a certain angle, while moving at a certain speed, direction or time, when subjected to a certain condition. As an example, the autonomous vehicle may have the natural tendency to deviate towards left direction at an angle of 10 degrees when load of the autonomous vehicle exceeds 100 kg, instead of moving straight along the planned navigation path due to the wear and tear of the autonomous vehicle. Therefore, the present disclosure helps in preventing the autonomous vehicle from deviating, by providing the correction velocity for navigating along the planned navigation path as originally intended.

Further, correction velocity in the present disclosure reduces efforts of adjusting steering angles in subsequent cycles by adjusting steering angle of the autonomous vehicle, in present cycle, more accurately/effectively. Also, reduced steering adjustment reduces power consumption of the autonomous vehicle. Further, the correction velocity generated in the present disclosure may provide a smooth navigation experience for the autonomous vehicle by minimizing jerks experienced by the autonomous vehicle.

A description of an embodiment with several components in communication with each other does not imply that all such components are required. On the contrary a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
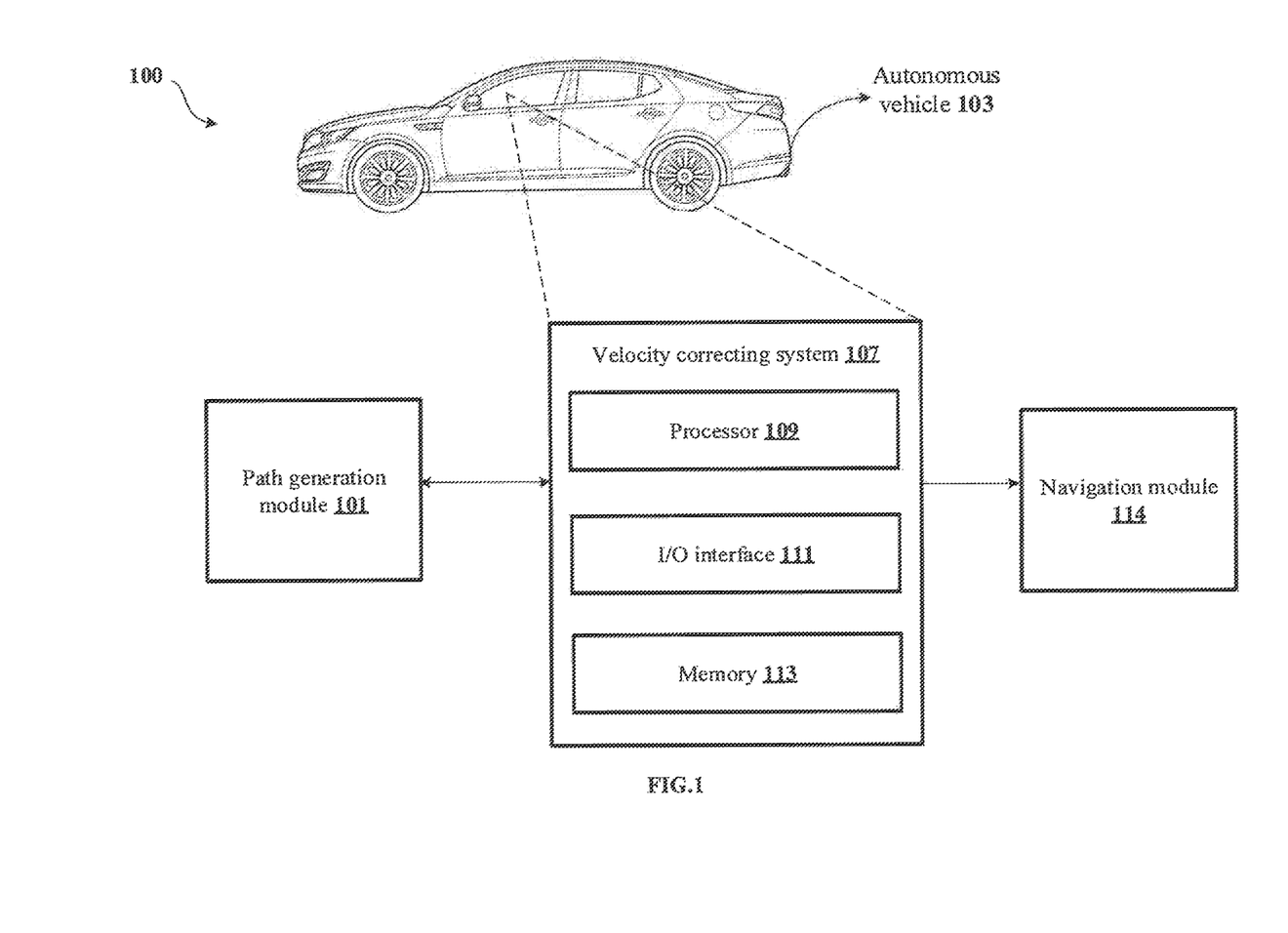
FIG. 1 shows an exemplary architecture illustrating correction of velocity of an autonomous vehicle to navigate along a planned navigation path in accordance with some embodiments of the present disclosure.

FIG. 1 shows an exemplary architecture for correcting velocity of an autonomous vehicle to navigate along a planned navigation path in accordance with some embodiments of the present disclosure.

The architecture 100 includes a path generation module 101, an autonomous vehicle 103, a velocity correcting system 107 and a navigation module 114. The path generation module 101 may be associated with an application related to maps such as a navigation application, a repository storing static maps and the like, to generate a planned navigation path for the autonomous vehicle 103. In some embodiments, the path generation module 101 may be associated with the velocity correcting system 107 via a communication network (not shown in FIG. 1). As an example, the communication network may include a wired communication network or a wireless communication network. In some embodiments, the velocity correcting system 107 may be configured within the autonomous vehicle 103 as shown in the FIG. 1. In some other embodiments, the velocity correcting system 107 may be remotely associated with the autonomous vehicle 103 via the wireless communication network. As an example, the autonomous vehicle 103 may be a bike, a car, a truck, a bus and the like.

The velocity correcting system 107 includes a processor 109, an Input/Output (I/O) interface 111 and a memory 113. The I/O interface 111 may be configured to receive a planned navigation path between a source point and a destination point, from the path generation module 101. In some embodiments, the path generation module 101 may obtain the planned navigation path using one or more predefined standard techniques such as Dijkstra's algorithm, A-star algorithm and the like, upon receiving the source point and the destination point. The source point and the destination point may be provided as inputs to the velocity correcting system 107 by a user associated with the velocity correcting system 107. Further, the I/O interface 111 may be configured to receive a velocity determined for navigating the autonomous vehicle 103 along the planned navigation path from the path generation module 101. Furthermore, the I/O interface 111 may be configured to provide a correction velocity to the navigation module 114 associated with the velocity correcting system 107. In some embodiments, the processor 109 may store the planned navigation path and the velocity in the memory 113 coupled with the processor 109.

Upon receiving the planned navigation path, the processor 109 may select a segment among one or more segments in the planned navigation path, while the autonomous vehicle 103 is navigating along the planned navigation path. In some embodiments, the processor 109 may generate the one or more segments dynamically based on a Field of View (FOV) of sensors such as image capturing sensors, Light Detection and Ranging (LIDAR) and the like, configured in the autonomous vehicle 103. As an example, a part of the planned navigation path which extends up to the FOV from a current position of the autonomous vehicle 103, may be generated and selected as the segment. Alternatively, in some embodiments, the one or more segments may be pre-generated based on a predefined distance configured in the velocity correcting system 107. As an example, a part of the planned navigation path that extends upto a predefined distance such as 5 metres, 10 metres and the like, may be selected as the segment.

Upon selecting the segment, the processor 109 may receive the velocity determined for navigating the autonomous vehicle 103 for the selected segment along the planned navigation path, from the path generation module 101. Further, the processor 109 may identify a plurality of values corresponding to current vehicle condition, for the selected segment. In some embodiments, the plurality of values corresponding to the current vehicle condition may be determined using one or more sensors configured in the autonomous vehicle 103. As an example, the one or more sensors may include, but not limited to, image capturing sensors such as cameras, terrain condition detecting sensors, Global Positioning System (GPS) sensors, occupancy detection sensors, inertial measurement units, load detecting sensors and Light Detection and Ranging (LIDAR).

In some embodiments, the processor 109 may measure the current vehicle condition with respect to wear and tear conditions of the autonomous vehicle 103, based on one or more parameters. In some embodiments, the wear and tear conditions of the autonomous vehicle 103 may be predefined. As an example, the one or more parameters may include, but not limited to, a speed of the autonomous vehicle 103, a load condition of the autonomous vehicle 103, a slope of the planned navigation path, a curvature of the planned navigation path. In some embodiments, the wear and tear condition may indicate a form of depreciation which is assumed to occur eventually and cause the autonomous vehicle 103 to undergo unwanted deviation and increases effort of the autonomous vehicle 103 while navigating. As an example, the wear and tear condition may be defined with respect to broken/corroded parts of the autonomous vehicle 103, alterations made to the autonomous vehicle 103, mechanical/electrical maintenance of the autonomous vehicle 103, overall distance covered by the autonomous vehicle 103 and the like.

Further, the processor 109 may compare the plurality of values corresponding to the current vehicle condition with pre-stored values to determine a counter angular velocity of the autonomous vehicle 103 for the selected segment of the planned navigation path. In some embodiments, the pre-stored values may be generated by conducting a trial run of the autonomous vehicle 103 under various predefined conditions of the autonomous vehicle 103, for the predefined wear and tear conditions. In some embodiments, the various predefined condition of the autonomous vehicle may be different combinations of the one or more parameters. As an example, the trial run of the autonomous vehicle 103 may be conducted under the predefined condition where speed of the autonomous vehicle 103 is 20 km/hr, load of the autonomous vehicle 103 is 100 kgs, slope of the planned navigation path is 10 degrees and curvature of the planned navigation path is 5 degrees. Various combinations of the pre-stored values associated with the parameters may be associated with a corresponding counter angular velocity. In some embodiments, the counter angular velocity may be recorded by conducting the trial run under various predefined conditions of the autonomous vehicle 103. Considering the above mentioned exemplary predefined condition, a counter angular velocity may be defined at 1.5 radian/sec for an autonomous vehicle 103 where speed is 20 km/hr, load is 100 kgs, slope of planned navigation path is 10 degrees and curvature is 5 degrees. Similarly, counter angular velocities may be defined for various combinations of the vehicle/road parameters that define the condition of the autonomous vehicle 103.

Further, the processor 109 may correct the velocity of the autonomous vehicle 103 by correlating the velocity with the counter angular velocity determined for the selected segment. In some embodiments, the processor 109 may provide the correction velocity to the navigation module 114 through the I/O interface 111. The navigation module 114 may iteratively apply the correction velocity for the selected segment at every predefined cycle time to navigate the autonomous vehicle 103 along the planned navigation path. In some embodiments, the processor 109 may determine number of iterations for applying the correction velocity for the selected segment, in real-time, based on the speed of the autonomous vehicle 103 and a length of the selected segment. Therefore, by iteratively applying the correction velocity, the processor 109 may compensate angular deviation that would have occurred due to the current vehicle condition, that in turn prevents deviation of the autonomous vehicle 103 from the planned navigation path.

Figure 2A:
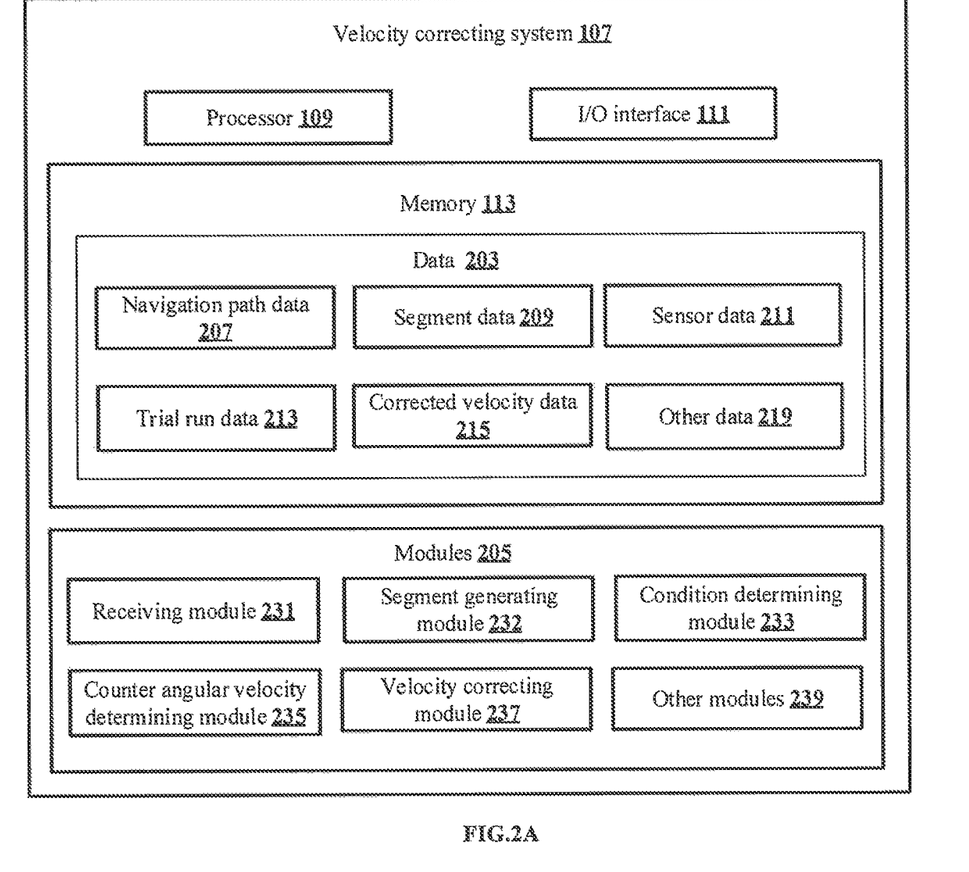
FIG. 2A shows a detailed block diagram of a velocity correcting system for correcting velocity of an autonomous vehicle to navigate along a planned navigation path in accordance with some embodiments of the present disclosure.

FIG. 2A shows a detailed block diagram of a velocity correcting system for correcting velocity of an autonomous vehicle to navigate along a planned navigation path in accordance with some embodiments of the present disclosure.

In some implementations, the velocity correcting system 107 may include data 203 and modules 205. As an example, the data 203 is stored in a memory 113 configured in the velocity correcting system 107 as shown in the FIG. 2A. In one embodiment, the data 203 may include navigation path data 207, segment data 209, sensor data 211, trial run data 213, correction velocity data 215 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the velocity correcting system 107.

In some embodiments, the data 203 stored in the memory 113 may be processed by the modules 205 of the velocity correcting system 107. The modules 205 may be stored within the memory 113. In an example, the modules 205 communicatively coupled to the processor 109 configured in the velocity correcting system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 231, a segment generating module 232, a condition determining module 233, a counter angular velocity determining module 235, a velocity correcting module 237 and other modules 239. The other modules 239 may be used to perform various miscellaneous functionalities of the velocity correcting system 107. It will be appreciated that such aforementioned modules 205 may be represented as a single module or a combination of different modules.

In some embodiments, the receiving module 231 may receive a planned navigation path between a source point and a destination point, from the path generation module 101 when the autonomous vehicle 103 is about to start a journey from the source point to the destination point. Further, the receiving module 231 may also receive velocity determined for navigating the autonomous vehicle 103 for a selected segment among one or more segments along the planned navigation path. The planned navigation path along with the velocity received for navigating the autonomous vehicle 103 may be stored as the navigation path data 207.

In some embodiments, the segment generating module 232 may generate the one or more segments along the planned navigation path dynamically based on a Field of View (FOV) of sensors such as image capturing sensors, Light Detection and Ranging (LIDAR) and the like, configured in the autonomous vehicle 103. As an example, the segment generating module 232 may generate a part of the planned navigation path which extends up to the FOV from a current position of the autonomous vehicle 103, as the segment. Alternatively, in some embodiments, the segment generating module 232 may pre-generate the one or more segments based on a predefined distance configured in the velocity correcting system 107. As an example, a part of the planned navigation path that extends upto a predefined distance such as 5 metres, 10 metres and the like, may be generated as the segment. The one or more segments of the planned navigation path may be stored as the segment data 209. As an example, the segment data 209 may include details of number of segments in the planned navigation path, the distance of each of the one or more segments and the like.

In some embodiments, the condition determining module 233 may initially identify a plurality of values corresponding to the current vehicle condition, for the selected segment, while the autonomous vehicle 103 is navigating along the planned navigation path. The condition determining module 233 may measure the current vehicle condition with respect to wear and tear condition of the autonomous vehicle 103, based on one or more parameters. In some embodiments, the wear and tear conditions may be previously measured. As an example, the one or more parameters may include, but not limited to, a speed of the autonomous vehicle 103, a load condition of the autonomous vehicle 103, a slope of the planned navigation path and a curvature of the planned navigation path. Further, the condition determining module 233 may determine the plurality of values corresponding to the one or more parameters using one or more sensors configured in the autonomous vehicle 103. As an example, the one or more sensors may include, but not limited to, image capturing sensors such as cameras, terrain condition detecting sensors, Global Positioning System (GPS) sensors, occupancy detection sensors, inertial measurement units, load detecting sensors and Light Detection and Ranging (LIDAR). Data received from the one or more sensors may be stored as the sensor data 211.

In some embodiments, the counter angular velocity determining module 235 may compare the plurality of values corresponding to the current vehicle condition with pre-stored values to determine a counter angular velocity of the autonomous vehicle 103 for the selected segment of the planned navigation path. In some embodiments, the pre-stored values may be generated by conducting a trial run of the autonomous vehicle 103 under various predefined conditions of the autonomous vehicle 103. Further, each of the pre-stored values may be associated with the corresponding counter angular velocity. The counter angular velocity may also be recorded by conducting the trial run under the various predefined conditions of the autonomous vehicle 103. The pre-stored values and the corresponding counter angular velocity associated with each of the pre-stored values may be stored as the trial run data 213. Further, in some embodiments, the various predefined conditions of the autonomous vehicle 103 may be different combinations of the one or more parameters.

As an example, the pre-stored values corresponding to the predefined conditions of the autonomous vehicle 103 when the autonomous vehicle 103 is moving at a speed of 4 meter/second, as shown in FIG. 2B, FIG. 2C, FIG. 2D and FIG. 2E.

Figure 2B:
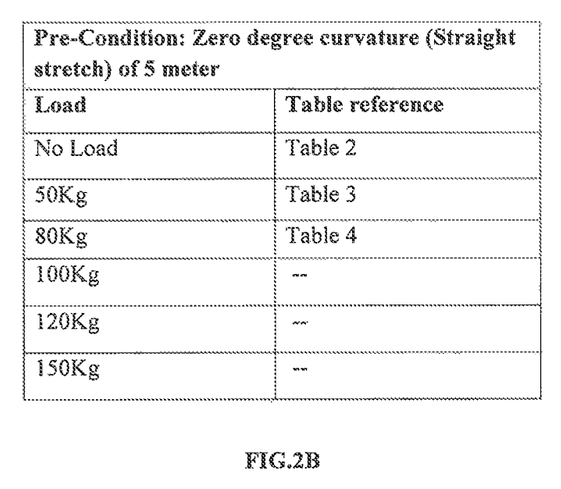
FIG. 2B, FIG. 2C, FIG. 2D and FIG. 2E show tables illustrating pre-stored values corresponding to predefined conditions of an autonomous vehicle, in accordance with some embodiments of the present disclosure.
Figure 2C:
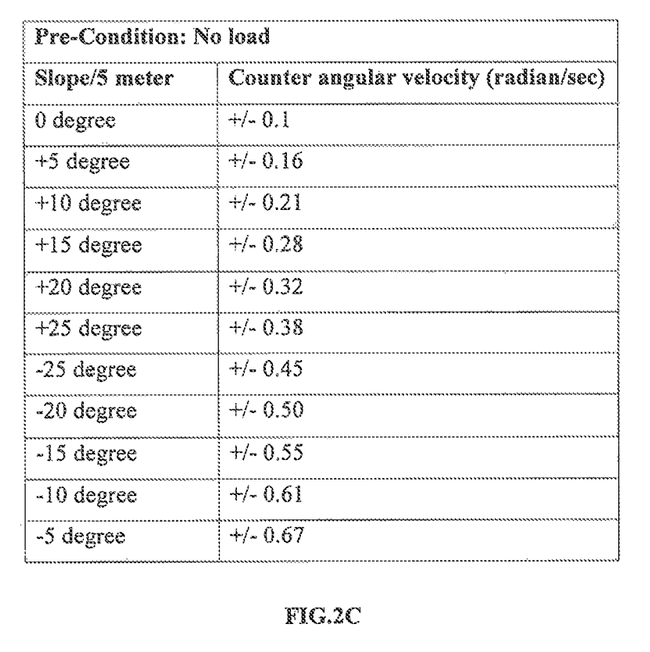
Figure 2D:
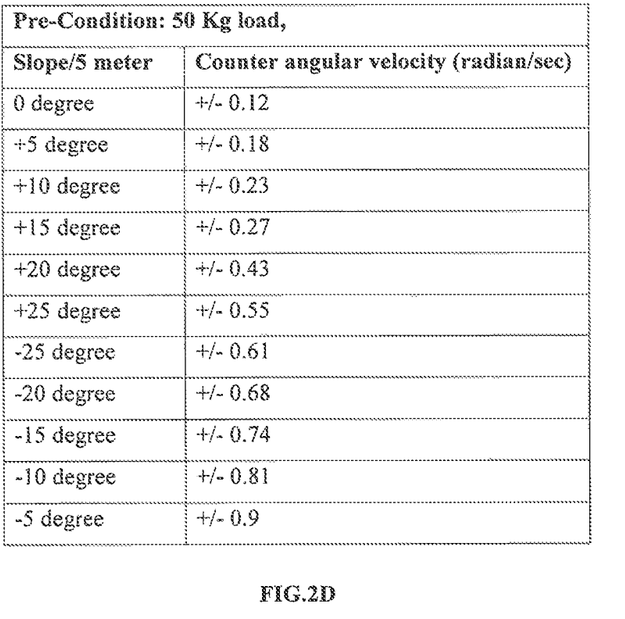
Figure 2E:
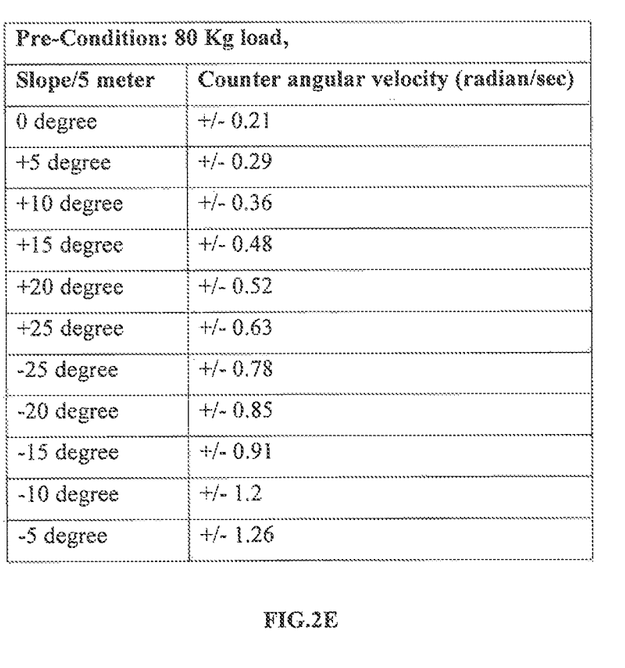

FIG. 2B illustrates a table in which, the predefined condition indicates curvature of the planned navigation path for the selected segment of length 5 meter as zero curvature. In some embodiments, the counter angular velocity determining module 235 may select the table illustrated in FIG. 2B, when the autonomous vehicle 103 is moving at a certain predefined speed and when the curvature of the planned navigation path for the selected segment is "Zero". Further, when the load condition is "No Load" for the selected segment of zero curvature, the counter angular velocity determining module 235 may refer to the table illustrated in the FIG. 2C for determining the counter angular velocity. In a different scenario, when the load condition is "50 Kg" for the selected segment of zero curvature, the counter angular velocity determining module 235 may refer to the table illustrated in FIG. 2D for determining the counter angular velocity. Similarly, when the load condition is "80 Kg" for the selected segment of zero curvature, the counter angular velocity determining module 235 may refer to the table illustrated in FIG. 2E for determining the counter angular velocity.

FIG. 2B, FIG. 2C, FIG. 2D and FIG. 2E represent a set of predefined conditions corresponding to the one or more parameters. Similarly, the pre-stored values are stored for various speeds as part of the trial run data 213.

Upon determining the counter angular velocity, the velocity correcting module 237 may correct the velocity of the autonomous vehicle 103. In some embodiments, the velocity correcting module 237 may correlate the velocity with the counter angular velocity to generate the correction velocity. Further, the velocity correcting module 237 may provide the correction velocity to a navigation module 114 associated with the velocity correcting system 107, for applying the correction velocity to navigate the autonomous vehicle 103 along the planned navigation path. In some embodiments, the navigation module 114 may iteratively apply the correction velocity for the selected segment at every predefined cycle time. In some embodiments, the velocity correcting module 237 may determine the number of iterations for the selected segment in real-time before providing the correction velocity to the navigation module 114. In some embodiments, the velocity correcting module 237 may determine the number of iterations based on the speed of the autonomous vehicle 103 and length of the selected segment. The correction velocity and the number of iterations may be stored as the correction velocity data 215.

Henceforth, the process of correction velocity of the autonomous vehicle 103 to navigate along a planned navigation path is explained with the help of one or more examples for better understanding of the present disclosure. However, the one or more examples should not be considered as limitation of the present disclosure.

Figure 2F:
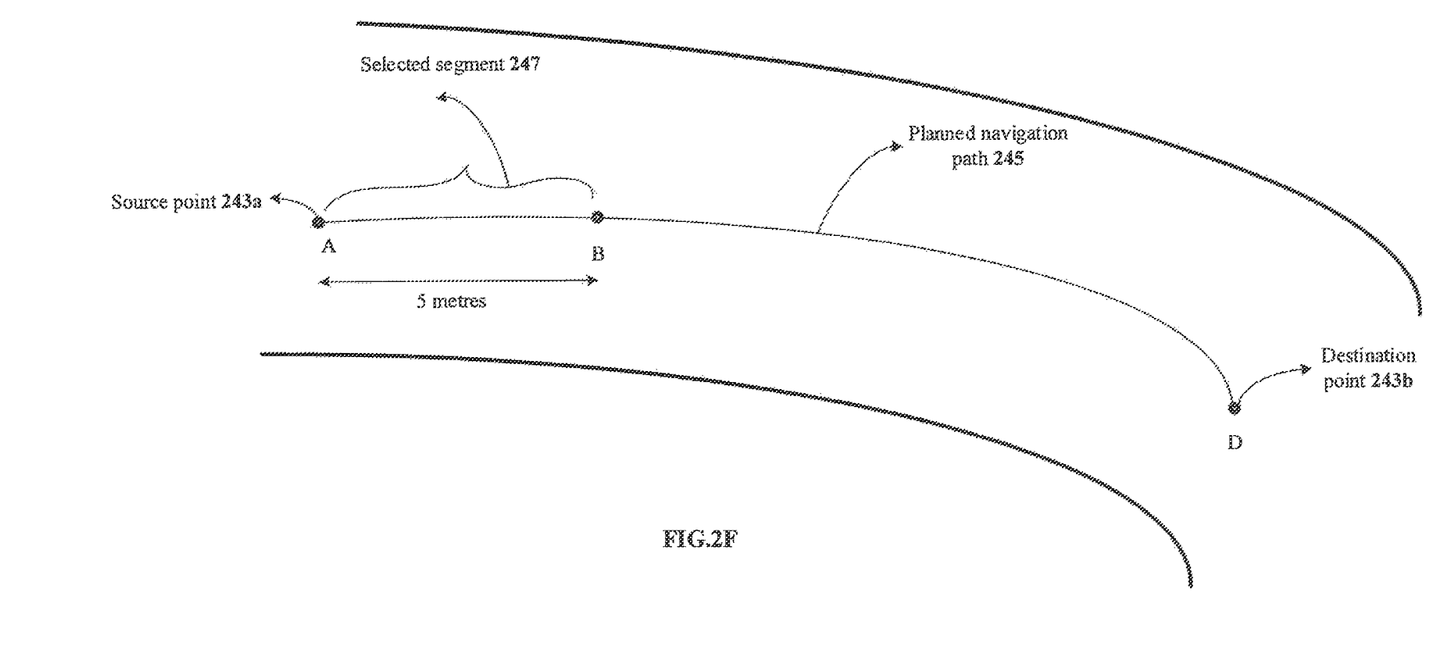
FIG. 2F and FIG. 2G show an exemplary embodiment for correcting velocity of an autonomous vehicle to navigate along a planned navigation path, in accordance with some embodiments of the present disclosure.

Consider an exemplary scenario as shown in the FIG. 2F, where the autonomous vehicle 103 intends to travel from the source point 243*a* to the destination point 243*b* through the planned navigation path 245. Consider a length of the selected segment 247 is 5 meters as shown in the FIG. 2F. Consider that the velocity received from the path generation module 101 for the selected segment is 6 meter/second. Further, consider the current vehicle condition with respect to the one or more parameters is determined to be:

Speed of the autonomous vehicle 103—4 meter/second
Load condition of the autonomous vehicle 103—50 Kg
Slope of the planned navigation path 245—15 degree
Curvature of the planned navigation path 245—0 degree
   i.e. zero curvature road (straight road)

Based on the current vehicle condition, the velocity correcting system 107 may predict an angular deviation of 1.3 radian by correlating the current vehicle condition with the pre-stored values. Therefore, to prevent the predicted angular deviation, the velocity correcting system 107 may compare the plurality of values corresponding to the current vehicle condition as mentioned above with the pre-stored values, to determine the counter angular velocity corresponding to the current vehicle condition. Based on the speed of the autonomous vehicle 103 i.e. 4 metre/second and the curvature of the planned navigation path 245, the velocity correcting system 107 may select the table illustrated in FIG. 2B of the pre-stored values to proceed further. Further, the based on the load condition of the autonomous vehicle 103 i.e. 50 Kg, the velocity correcting system 107 may next select the table illustrated in FIG. 2D of the pre-stored values. Furthermore, in the table illustrated in FIG. 2D, the velocity correcting system 107 may identify the pre-stored slope value that matches the current slope of the planned navigation path 245 i.e. "+15 degree", to determine the counter angular velocity corresponding to the pre-stored slope value "+15 degree". Therefore, in accordance with the table illustrated in FIG. 2D, the counter angular velocity corresponding to the pre-stored slope value is 0.27 radian/second. Further, the velocity correcting system 107 may correlate the counter angular velocity with the velocity received from the path generation module 101, to generate the correction velocity for the selected segment 247.

As an example, consider the correction velocity determined for the selected segment 247 by correlating the velocity "6 meter/second" and the counter angular velocity "0.27 radian/second" is 0.32 radian/second. However, to overcome the predicted angular deviation of 1.3 radian, the correction velocity should be applied iteratively at predefined cycle time until the end of the selected segment 247. Consider in this scenario, the predefined cycle time is 300 ms. In some embodiments, the velocity correcting system 107 may determine the number of iterations required for applying the correction velocity for the selected segment 247, based on the speed of the autonomous vehicle 103 and the length of the selected segment 247. In this scenario, the speed of the autonomous vehicle 103 is "4 metre/second" and the length of the selected segment 247 is "5 metre".

To determine the number of iterations, the velocity correcting system 107 may initially determine the time required for the autonomous vehicle 103 to navigate along the selected segment 247 with the current vehicle condition, by using the below Equation 1.

$$T = L/S \qquad \text{Equation 1}$$

In the above Equation 1,

T indicates time required for the autonomous vehicle 103 to navigate along the selected segment 247;

L indicates the length of the selected segment 247; and

S indicates the speed of the autonomous vehicle.

Therefore, by using the above Equation 1, in the current scenario, the time required for the autonomous vehicle 103 to navigate along the selected segment 247 is $5/4 = 1.25$ seconds. However, the predefined cycle time is 300 ms. Since 4 times of the predefined cycle time i.e. 300 ms would be required to cover the time 1.25 seconds for the selected segment 247, the velocity correcting system 107 may determine the number of iterations as 4, as shown in the FIG. 2G.

Figure 2G:
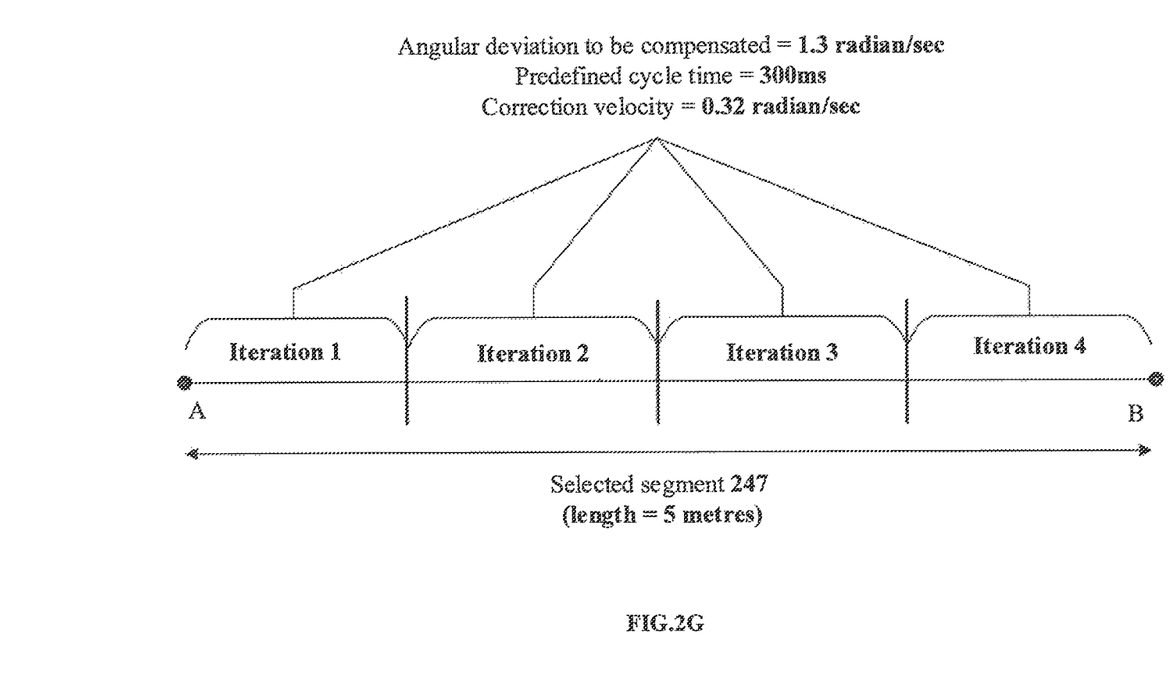

Therefore, the navigation module 114 may apply the correction velocity of 0.32 radian/second for 4 times for the selected segment 247 to prevent the predicted angular deviation of 1.3 radian.

Figure 3:
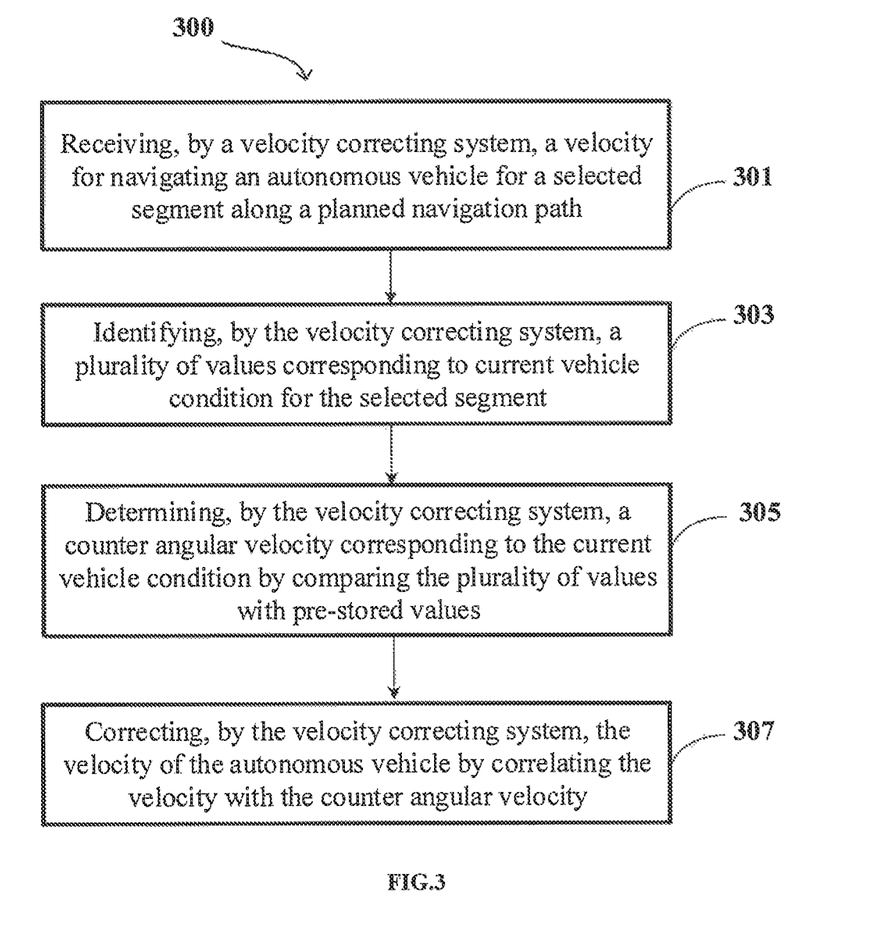
FIG. 3 shows a flowchart illustrating a method of correcting velocity of an autonomous vehicle to navigate along a planned navigation path in accordance with some embodiments of the present disclosure.

FIG. 3 shows a flowchart illustrating a method of correcting velocity of an autonomous vehicle to navigate along a planned navigation path in accordance with some embodiments of the present disclosure.

As illustrated in FIG. 3, the method 300 includes one or more blocks illustrating a method of correcting velocity of an autonomous vehicle 103 to navigate along a planned navigation path. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the velocity correcting system 107, a velocity for navigating the autonomous vehicle 103 for a selected segment among one or more segments along the planned navigation path. In some embodiments, the processor 109 may receive the velocity for the selected segment from a path generation module 101 associated with the velocity correcting system 107.

At block 303, the method 300 may include identifying, by the processor 109, a plurality of values corresponding to a current vehicle condition, for the selected segment, while the autonomous vehicle 103 is navigating along the planned navigation path. In some embodiments, the processor 109 may measure the current vehicle condition, with respect to wear and tear condition of the autonomous vehicle 103, based on one or more parameters. As an example, the one or more parameters may include, but not limited to, a speed of the autonomous vehicle 103, a load condition of the autonomous vehicle 103, a slope of the planned navigation path and a curvature of the planned navigation path.

At block 305, the method 300 may include, determining, by the processor 109, a counter angular velocity corresponding to the current vehicle condition. In some embodiments, the processor 109 may compare the plurality of values with pre-stored values to determine the counter angular velocity. In some embodiments, the pre-stored values may be generated based on a trial run of the autonomous vehicle 103 under various predefined conditions of the autonomous vehicle 103.

At block 307, the method 300 may include, correcting, by the processor 109, the velocity of the autonomous vehicle 103, by correlating the velocity with the counter angular velocity. Further, the processor 109 may provide the correction velocity to a navigation module 114 associated with the velocity correcting system 107, for applying the correction velocity to navigate the autonomous vehicle 103 along the planned navigation path. In some embodiments, the navigation module 114 may iteratively apply the correction velocity for the selected segment. In some embodiments, the processor 109 may determine number of iterations required for applying the correction velocity based on the speed of the autonomous vehicle 103 and length of the selected segment, in real-time, and may provide the number of iterations along with the correction velocity to the navigation module 114.

Figure 4:
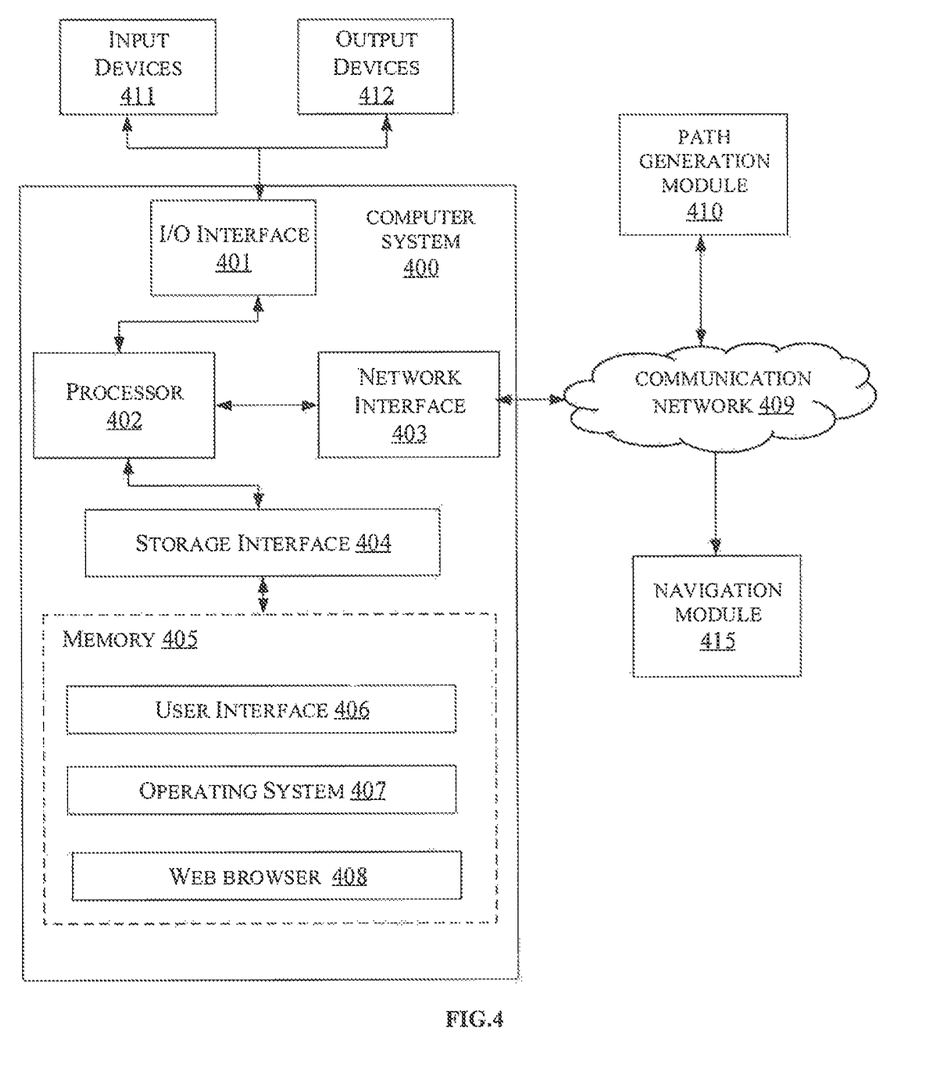
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be velocity correcting system 107 that is used for correcting velocity of an autonomous vehicle 103 to navigate along a planned navigation path. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with path generation module 410 ($410_a$ up to $410_n$), and a navigation module 415. The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

The present disclosure provides a method and a system for correcting a velocity of an autonomous vehicle to navigate along a planned navigation path.

The present disclosure generates a correction velocity that eliminates the need for continuous monitoring and steering angle adjustment to align the autonomous vehicle with the planned navigation path, thereby reducing power consumption by the autonomous vehicle.

The present disclosure generates the correction velocity by considering profile of the autonomous vehicle and terrain condition where the autonomous vehicle is navigating. Therefore, the correction velocity helps in achieving a smooth and safe navigation experience by minimizing jerks experienced by the autonomous vehicle.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for correcting a velocity of an autonomous vehicle to navigate along a planned navigation path. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | Path generation module |
| 103 | Autonomous vehicle |
| 107 | Velocity correcting system |
| 109 | Processor |
| 111 | I/O interface |
| 113 | Memory |

-continued

| Referral numerals | |
|---|---|
| Reference Number | Description |
| 114 | Navigation module |
| 203 | Data |
| 205 | Modules |
| 207 | Navigation path data |
| 209 | Segment data |
| 211 | Sensor data |
| 213 | Trial run data |
| 215 | Correction velocity data |
| 219 | Other data |
| 231 | Receiving module |
| 232 | Segment generating module |
| 233 | Condition determining module |
| 235 | Counter angular velocity determining module |
| 237 | Velocity correcting module |
| 239 | Other modules |
| 243a | Exemplary source point |
| 243b | Exemplary destination point |
| 245 | Exemplary planned navigation path |
| 247 | Exemplary selected segment |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 410 | Path generation module of the exemplary computing system |
| 411 | Input devices |
| 412 | Output devices |
| 415 | Navigation module of the exemplary computing system |

What is claimed is:

1. A method of correcting velocity of an autonomous vehicle to navigate along a planned navigation path, the method comprising:

receiving, by a velocity correcting system associated with the autonomous vehicle, a velocity for navigating the autonomous vehicle for a selected segment among one or more segments along the planned navigation path;

identifying, by the velocity correcting system, a plurality of values corresponding to a current vehicle condition, for the selected segment, while the autonomous vehicle is navigating along the planned navigation path;

determining, by the velocity correcting system, a counter angular velocity corresponding to the current vehicle condition by comparing the plurality of values with pre-stored values, wherein the pre-stored values are generated based on a trial run of the autonomous vehicle under various predefined conditions of the autonomous vehicle; and correcting, by the velocity correcting system, the velocity of the autonomous vehicle, by correlating the velocity with the counter angular velocity, and providing the correction velocity to a navigation module associated with the velocity correcting system, for applying the correction velocity to navigate the autonomous vehicle along the planned navigation path, wherein the correction velocity is iteratively applied for the selected segment at every predefined cycle time, wherein a number of iterations for the selected segment is determined in real-time.

2. The method as claimed in claim 1, wherein the plurality of values corresponding to the current vehicle condition are measured with respect to wear and tear condition of the autonomous vehicle, based on one or more parameters comprising at least one of a speed of the autonomous vehicle, a load condition of the autonomous vehicle, a slope of the planned navigation path and a curvature of the planned navigation path.

3. The method as claimed in claim 1, wherein the pre-stored values corresponding to the various predefined conditions of the autonomous vehicle are associated with a corresponding counter angular velocity.

4. The method as claimed in claim 1, wherein the plurality of values corresponding to the current vehicle condition are identified using one or more sensors configured in the autonomous vehicle.

5. The method as claimed in claim 1, wherein the number of iterations is determined based on a speed of the autonomous vehicle and length of the selected segment.

6. A velocity correcting system for correcting velocity of an autonomous vehicle to navigate along a planned navigation path, the velocity correcting system comprising:
   a processor; and
   a memory communicatively coupled to the processor, wherein the memory stores the processor-executable instructions, which, on execution, causes the processor to:
      receive a velocity for navigating the autonomous vehicle for a selected segment among one or more segments along the planned navigation path;
      identify a plurality of values corresponding to a current vehicle condition, for the selected segment, while the autonomous vehicle is navigating along the planned navigation path;
      determine a counter angular velocity corresponding to the current vehicle condition by comparing the plurality of values with pre-stored values, wherein the pre-stored values are generated based on a trial run of the autonomous vehicle under various predefined conditions of the autonomous vehicle; and
      correct the velocity of the autonomous vehicle, by correlating the velocity with the counter angular velocity, and providing the correction velocity to a navigation module associated with the velocity correcting system, for applying the correction velocity to navigate the autonomous vehicle along the planned navigation path, wherein the processor iteratively applies the correction velocity for the selected segment at every predefined cycle time, wherein a number of iterations for the selected segment is determined in real-time.

7. The velocity correcting system as claimed in claim 6, wherein the processor measures the plurality of values corresponding to the current vehicle condition, with respect to wear and tear condition of the autonomous vehicle 103, based on one or more parameters comprising at least one of a speed of the autonomous vehicle, a load condition of the autonomous vehicle, a slope of the planned navigation path and a curvature of the planned navigation path.

8. The velocity correcting system as claimed in claim 6, wherein the pre-stored values corresponding to the various predefined conditions of the autonomous vehicle are associated with a corresponding counter angular velocity.

9. The velocity correcting system as claimed in claim 6, wherein the processor identifies the plurality of values corresponding to the current vehicle condition using one or more sensors configured in the autonomous vehicle.

10. The velocity correcting system as claimed in claim 6, wherein the number of iterations is determined based on a speed of the autonomous vehicle and length of the selected segment.

11. A non-transitory computer readable medium including instructions stored thereon that when processed by at least one processor causes a vehicle correcting system to perform operations comprising:
   receiving a velocity for navigating the autonomous vehicle for a selected segment among one or more segments along the planned navigation path;
   identifying a plurality of values corresponding to a current vehicle condition, for the selected segment, while the autonomous vehicle is navigating along the planned navigation path;
   determining a counter angular velocity corresponding to the current vehicle condition by comparing the plurality of values with pre-stored values, wherein the pre-stored values are generated based on a trial run of the autonomous vehicle under various predefined conditions of the autonomous vehicle; and
   correcting the velocity of the autonomous vehicle, by correlating the velocity with the counter angular velocity, and providing the correction velocity to a navigation module associated with the velocity correcting system, for applying the correction velocity to navigate the autonomous vehicle along the planned navigation path, wherein the processor iteratively applies the correction velocity for the selected segment at every predefined cycle time, wherein a number of iterations for the selected segment is determined in real-time.

* * * * *